US006401973B1

(12) United States Patent
Derouault et al.

(10) Patent No.: US 6,401,973 B1
(45) Date of Patent: Jun. 11, 2002

(54) INSTALLATION FOR PACKAGING A PRODUCT IN CONTAINERS CLOSED WITH A STOPPER AND DYNAMIC STORAGE DEVICE FOR STOPPERS USABLE THEREIN

(75) Inventors: Philippe Derouault; Patrick Mie; Jean-Louis Pellegatta, all of Octeville-sur-Mer (FR)

(73) Assignee: Sidel S.A., Octeville-sur-Mer (FR)

(*) Notice: Subject to any disclaimer, the term of this patent is extended or adjusted under 35 U.S.C. 154(b) by 0 days.

(21) Appl. No.: 09/993,508

(22) Filed: Nov. 27, 2001

Related U.S. Application Data

(62) Division of application No. 09/446,986, filed as application No. PCT/FR98/01409 on Jul. 1, 1998, now Pat. No. 6,341,469.

(30) Foreign Application Priority Data

Jul. 3, 1997 (FR) ........................................... 97 08426

(51) Int. Cl.[7] ................................................ B65G 59/00
(52) U.S. Cl. ....................................... 221/120; 221/132
(58) Field of Search .......................... 221/92, 119, 120, 221/113, 121, 122, 132, 7, 9, 13, 105, 76, 79; 53/75

(56) References Cited

U.S. PATENT DOCUMENTS 3,527,017 A 9/1970 Taylor et al.
4,277,928 A 7/1981 Ahlers
4,361,759 A 11/1982 King et al.
5,067,630 A * 11/1991 Nesser et al. ............... 221/120
5,176,285 A * 1/1993 Shew ......................... 221/120
5,301,488 A 4/1994 Ruhl et al.
5,996,322 A 12/1999 La Barre

FOREIGN PATENT DOCUMENTS

EP 066 119 12/1982
EP 188 153 7/1986
WO WO 96/29245 9/1996

* cited by examiner

*Primary Examiner*—Kenneth W. Noland
(74) *Attorney, Agent, or Firm*—Sughrue Mion, PLLC

(57) ABSTRACT

An installation for the packaging of a product in containers closed with a stopper, including in particular a filling machine (1), a stopping machine (3) and, upstream of this, a device (6) for the dynamic storage of stoppers suitable to drive the stoppers continuously and with a pre-specified pitch, the number of stoppers present simultaneously in the device (6) being at least equal to that of the containers present in a pre-specified part (7) of the installation, means (8) for the control of the supply of stoppers being provided upstream of the device (6) to control a device (10) for supplying containers located upstream of the pre-specified part (7); thus, for every container engaged in the pre-specified part (7) corresponds a stopper present in the device (6) supplying the stopping machine (3) and, in the event of an incident in the supply of stoppers upstream of the device (6), the supply of containers from the pre-specified part (7) is controlled (9, 10) while maintaining the operation of the terminal part of the installation at least until the incident is over.

2 Claims, 3 Drawing Sheets

INSTALLATION FOR PACKAGING A PRODUCT IN CONTAINERS CLOSED WITH A STOPPER AND DYNAMIC STORAGE DEVICE FOR STOPPERS USABLE THEREIN

This is a divisional of application Ser. No. 09/446,986 filed Dec. 30, 1999, now U.S. Pat. No. 6,341,469 which is a National Stage Application filed under §371 of PCT Application No. PCT/FR98/01409 filed Jul. 1, 1998; the above noted prior applications are all hereby incorporated by reference; the international application to which benefit is claimed was not published under PCT Article 21(2) in English.

The present invention concerns improvements brought to installations for packaging a product in containers closed with a stopper and including in particular a filling machine suitable to fill containers received empty and a stopping machine supplied with stoppers for the closing of the filled containers.

In the packaging installations such as aforementioned, an incident occurring in the supplying of stoppers to the stopping machine may have serious effects on the principal conveying line of the containers, and/or can cause the loss of a substantial number of containers in any state, and/or can cause a substantial loss of the product to be packaged.

This is the case, in particular, in the installations packaging the product in thermoplastic containers (PET for example) which include in line a supply of preforms, a oven for heating the preforms and a blower for the moulding of containers coming from heated preforms, followed by aforementioned filling machine and stopping machine. In this type of installation, an incident occurring in the supplying of stoppers necessitates, for the repairing operation, the stopping of the whole installation. The preforms during heating in the oven and during blowing in the moulds are then lost; moreover, considering the very high temperatures and the thermal inertias, the preforms present in the oven and the blowing moulds risk melting and/or sticking to the walls of the moulds, so that putting the installation back into operation must be preceded by an inspection and a cleaning.

In addition, for installations for packaging in an aseptic environment or packaging of volatile products for example, it is preferable that the stopping occurs as soon as the filling of the container is completed; otherwise the aseptic character of the product may not be ensured or the volatile product disperses: the containers and their contents may not be used and are lost.

Thus, it turns out in practice that numerous incidents in the supply of stoppers occur downstream of the stopping machine (for example two stoppers wedged in each other, poor positioning, etc). These incidents could be detected therefore well before the non usable stopper reaches the stopping device itself and it should then become possible to anticipate the incident at the working level of the rest of the installation and to avoid losses of filling and/or contained product, indeed a damaging of the installation.

The object of the invention is therefore to propose an improvement in the supply of stoppers suitable to avoid aforementioned disadvantages and to make shorter and less expensive, in all its aspects, the stoppage of the installation following a stopper supplying incident.

To this end, an installation such as mentioned in the introduction is characterised mainly, being arranged according to the invention, in that it includes in addition, upstream of the stopping machine, a device for the dynamic storage of stoppers suitable for continuously driving the stoppers with a pre-specified pitch, the number of stoppers simultaneously present in said storage device being at least equal to the number of containers present in a pre-specified part of the installation, control means for supplying stoppers being provided upstream of the dynamic storage device and being arranged to control a device supplying containers located upstream, preferably at the inlet, of aforesaid pre-specified part of the installation, by means of which arrangement whatever container is engaged in the pre-specified part of the installation there corresponds a stopper present in the device for the dynamic storage of stoppers supplying the stopping machine and, in the event of an incident in the supply of stoppers upstream of the dynamic storage device, the supply of containers to said pre-specified part of the installation is controlled while maintaining in operation the terminal part of the installation at least until this incident is over.

There is thus formed, upstream of the stopping device, a buffer reservoir of stoppers which are individualised and of known number, so that risks of incident at this level in the supply of stoppers to the stopping device is considerably reduced and, in the event of an incident upstream of this buffer reservoir, it is then possible to be able to continue to process all the containers present in said pre-specified part of the installation. Preferably, the supply of containers is controlled by interrupting the upstream supply of containers until the incident is over: alternatively, instead of interrupting this supply, the supply of stoppers is regulated by carrying out a controlled sliding or moving back relative to the containers particularly when the moving back involves a small number (one or two for example) of stoppers.

In a possible implementation of the invention the pre-specified part of the installation includes at least the filling machine and the capacity of the device for the storage of stoppers is at least equal to the number of containers simultaneously present between the inlet of the filling machine and the inlet of the stopping machine.

In another implementation, the invention is applied to an in-line installation arranged for the packaging of a product into thermoplastic material containers (for example of PET) and including in particular, upstream of the filling machine, a preform supply unit, an oven for heating the preforms and a blower to produce containers from the heated preforms; in this case aforementioned pre-specified part of the installation includes at least the oven for heating the preforms and the capacity of the device for the storage of stoppers is at least equal to the number of preforms simultaneously present in the oven.

It can, in addition, be very desirable that aforesaid pre-specified part of the installation includes in addition at least the blower and that the capacity of the device for the storage of stoppers is at least equal to the number of containers (preforms, rough cuts or finished containers) present between the inlet of the oven and the outlet of the blower.

Finally, at least for some areas of application (aseptic packaging for example), it can be worthwhile that aforesaid pre-specified part of the installation includes in addition the filling machine and the stopping machine and that the capacity of the device for the storage of stoppers is at least equal to the number of containers (preforms, rough cuts, or empty or filled finished containers) present between the inlet of the oven and the inlet of the stopping machine.

Thus is won the considerable advantage of avoiding a loss of filled but not stopped containers (aseptic filling), a loss of containers during manufacture (blower/in-line filling machine), a cleaning of the hot units (oven, blowing moulds), and finally the completion of the incident can be carried out without stopping the installation: immediately after completion, the supply of containers can be restarted normally.

In a perfected version, the control means for the supply of stoppers are arranged to regulate the supply of stoppers in the event of an incident in the supply of containers (preforms, rough cuts, or finished or filled containers), for example either by blocking the supply of stoppers, or by causing a sliding of the stoppers relative to the containers.

Although the device for the dynamic storage of stoppers can in principle be arranged in any appropriate way, it is however particularly desirable that it extends approximately vertically so as to occupy a minimum vertical projection surface and to not cause an ill-considered increase in the general dimensions of the installation.

According to another of its aspects, the invention also relates to a particularly worthwhile arrangement of a dynamic storage device for a pre-specified number of stoppers intended for the closing of a succession of filled containers, this device being intended to be used in particular in an installation such as aforementioned in the previous paragraph and comprising:

means for supplying stoppers pre-positioned and placed one after the other, conveyor means moving the stoppers on a trajectory having a length a function of aforesaid pre-specified number of stoppers, and withdrawal means located at the outlet of said conveyor means to catch the stoppers one by one.

Such a device, arranged according to the invention, is characterised mainly in that the conveyor means include:

a cylinder rotating around a vertical axis and having, on its peripheral surface, a multiplicity of vertical parallel cavities, and a fixed helicoidal track narrowly surrounding the cylinder over all its height and suitable for supporting stoppers otherwise partially engaged individually in aforesaid respective cavities of the cylinder so as to be driven on the helicoidal trajectory defined by the track when the cylinder rotates, the number of revolutions of the helicoidal track and the number of vertical cavities constituted on the periphery of the cylinder defining aforesaid pre-specified number of stoppers simultaneously present in the device.

It is understood that, because of the arrangements of the invention, it is possible to constitute a buffer reservoir of stoppers having a capacity which can be very high, as a function of the diameter of the cylinder and of the number of vertical cavities present on the periphery of this, and above all, for a given diameter of the cylinder, a function of its height. In particular, it is possible to constitute a reservoir of a very high capacity although occupying little vertical projection space and therefore of small size. Its structure is simple and requires standard mechanical parts. Its driving, which must be synchronised with that of the stopping device and with the rest of the installation, may not require a specific motorisation and can be obtained by a traditional return movement (chain, belt, etc.).

The invention will be better understood by reading the detailed description which follows of certain preferred versions given only as non-restrictive examples. In this description, the appended drawings are referred to in which.

Figure 1:
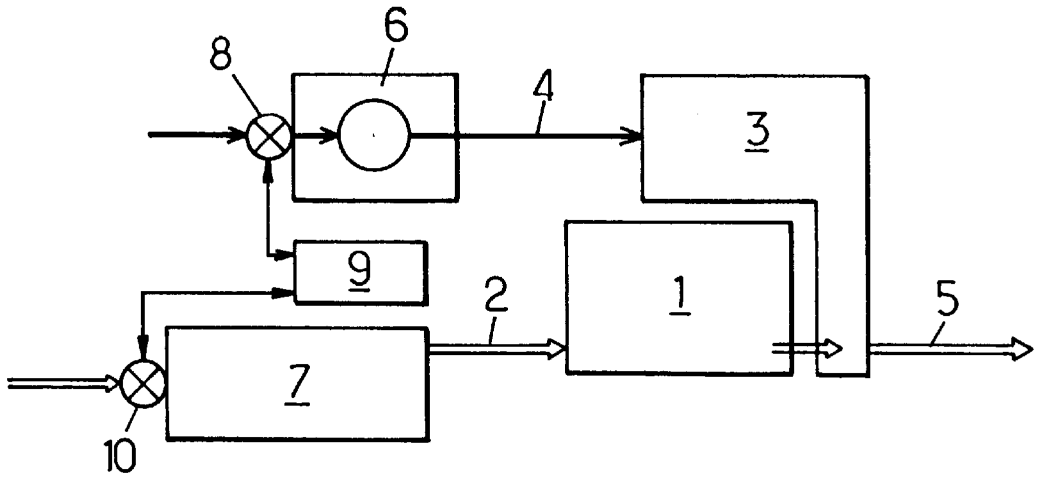
FIG. 1 is a very simplified diagram of a filling/stopping installation arranged according to the invention by using a device for the dynamic storage of stoppers.

By referring first of all to FIG. 1, it is shown there, in a very diagrammatic way, the mechanical arrangement of an installation designed according to the invention for the packaging of a product, in particular of a liquid or flowing product, into containers—such as bottles, small bottles, cans, etc., having a neck and closed by a stopper. This installation includes in particular to this end a filling machine 1 suitable to fill containers received empty (arrow 2) and to which is added a stopping machine 3 supplied with stoppers (arrow 4) for the closing of the filled containers which are then removed (arrow 5).

According to the invention, upstream of the stopping machine 3 a device 6 for the dynamic storage of stoppers is provided which is suitable to drive the stoppers towards the stopping machine continuously one after the other with a pre-specified pitch. The number of stoppers simultaneously present in the storage device 6 is at least equal to the number of containers present in a pre-specified part of the installation: this pre-specified part can include at least any operating unit 7 of the installation located on the supply line of containers upstream of the filling machine 1, and can include also the filling machine 1 itself; the pre-specified part 7 is at the least composed of the means of introduction of the containers into the filling machine 1, but a concrete example will be given later in reference to FIG. 2.

Upstream, and preferably at the inlet of the storage device 6 control means 8 are provided arranged to control the supply of stoppers and to detect any anomaly in the supplying of stoppers (absence of a stopper, mixed up stoppers, stoppers in upside down position, etc). The control means 8 are connected to a management unit 9 which in particular controls a control and detection device 10 of the container supply in the pre-specified part 7 of the installation (operating control of the conveyor for example): in the event of a stopper supply incident detected by the means 8, the unit 9 controls (for example blocks) the supply of containers until the supply incident is over, by controlling the device 10 in an appropriate way.

In this arrangement, for every container introduced into the pre-specified part 7 of the installation (whatever the type of container: finished container ready to be filled, or preform intended for the manufacture of a container having then to be filled, or again a rough cut of a container in process of manufacture and having then to be filled) there corresponds in a certain way a stopper present in the device 6 for the dynamic storage of stoppers supplying the stopping machine 3.

In the event of an incident, the filling machine 1 continues concomitantly to operate in a way to use up all the containers located, at the time of the blocking of the chain at 10, in the pre-specified part 7 of the installation. All these filled containers can be stopped with the store of stoppers which are present in the dynamic storage device 6.

The stopping of the supply of containers in order to rectify the stopper supply fault is carried out therefore without loss of the product to be packaged, without loss of containers, and without risk of damaging the installation as will be explained later.

According to a first arrangement possibility of the installation, the aforementioned pre-specified part 7 of the installation includes the filling machine 1: the capacity of the storage device 6 is then at least equal to the number of containers simultaneously present between the inlet of the filling machine and the inlet of the stopping machine. The detection at 8 of a stopper supply anomaly causes at 10 the stopping of the supply of containers at the inlet of the filling machine.

The arrangements which have just been described find a particularly interesting application in an installation arranged for the packaging of a product in thermoplastic material containers (for example PET) which include in-line all the manufacturing operations of the container and the filling/stopping. This installation includes then in particular, as illustrated in FIG. 2, a supply unit 11 of preforms, an oven 12 for heating the preforms and a blower 13 for producing, by blowing or drawing-blowing hot preforms in moulds, finished containers which are then conveyed to the filling machine 1, with which is associated a stopping machine 3 supplied with stoppers through a device 6 for the dynamic storage of stoppers according to the diagram of FIG. 1.

Figure 2:
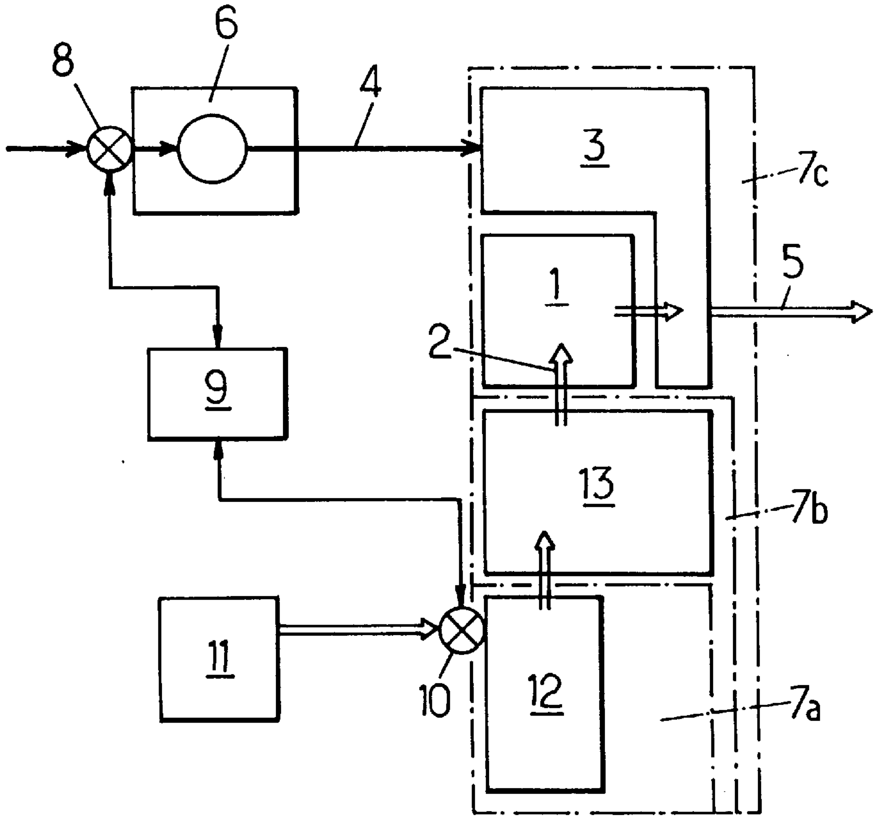
FIG. 2 is a very simplified diagram of a heating/blowing/filling/stopping installation arranged according to the invention by using a device for the dynamic storage of stoppers.

In this case, the aforementioned pre-specified part of the installation, designated by the reference 7*a* in FIG. 2, can include at least the oven for heating the preforms 12: the stopper capacity of the storage device 6 is then at least equal to the number of containers (here heated preforms) present simultaneously in the oven.

The detection at 8 of a stopper supply anomaly causes at 10 the topping of the preforms supply to the inlet of the oven 12. However, all the part of the installation located downstream of the stoppage device 10 continues to operate until the emptying of all the heated preforms from the oven 12.

In this way the preforms being immobilised in the oven and being overheated with the risk of fusion and calcination of the plastic material is avoided; the resulting cleaning constraint is removed; also the loss of a significant number of preforms is avoided, because all the preforms introduced into the oven are then converted into containers, filled and stopped.

However, a similar risk also exists within the blower in which the hot plastic material risks adhering to the wall of the moulds in the event of prolonged contact. It is therefore prudent to arrange that the pre-specified part of the installation includes simultaneously the oven 12 and the blower 13 as drawn at 7*b* in FIG. 2, and that the capacity of the storage device 6 is at least equal to the number of containers (preforms, rough cuts or finished containers) simultaneously present between the inlet of the oven 12 and the outlet of the blower 13.

Finally, at least for some applications (aseptic filling or volatile products for example), it is necessary that the containers are closed immediately after their filling; if the stopping has not quickly followed the filling, the containers and their contents must be scrapped. To avoid this loss, it is desirable to arrange the installation so that the aforementioned pre-specified part simultaneously includes the oven 12, the blower 13, the filling machine 1 and the stopping machine 3 as drawn in 7*c* in FIG. 2 and that the capacity of the storage device 6 is at least equal to the number of containers (preforms, rough cuts and finished empty or filled containers) located between the inlet of the oven 12 and the inlet of the stopping machine 3.

Figure 4:
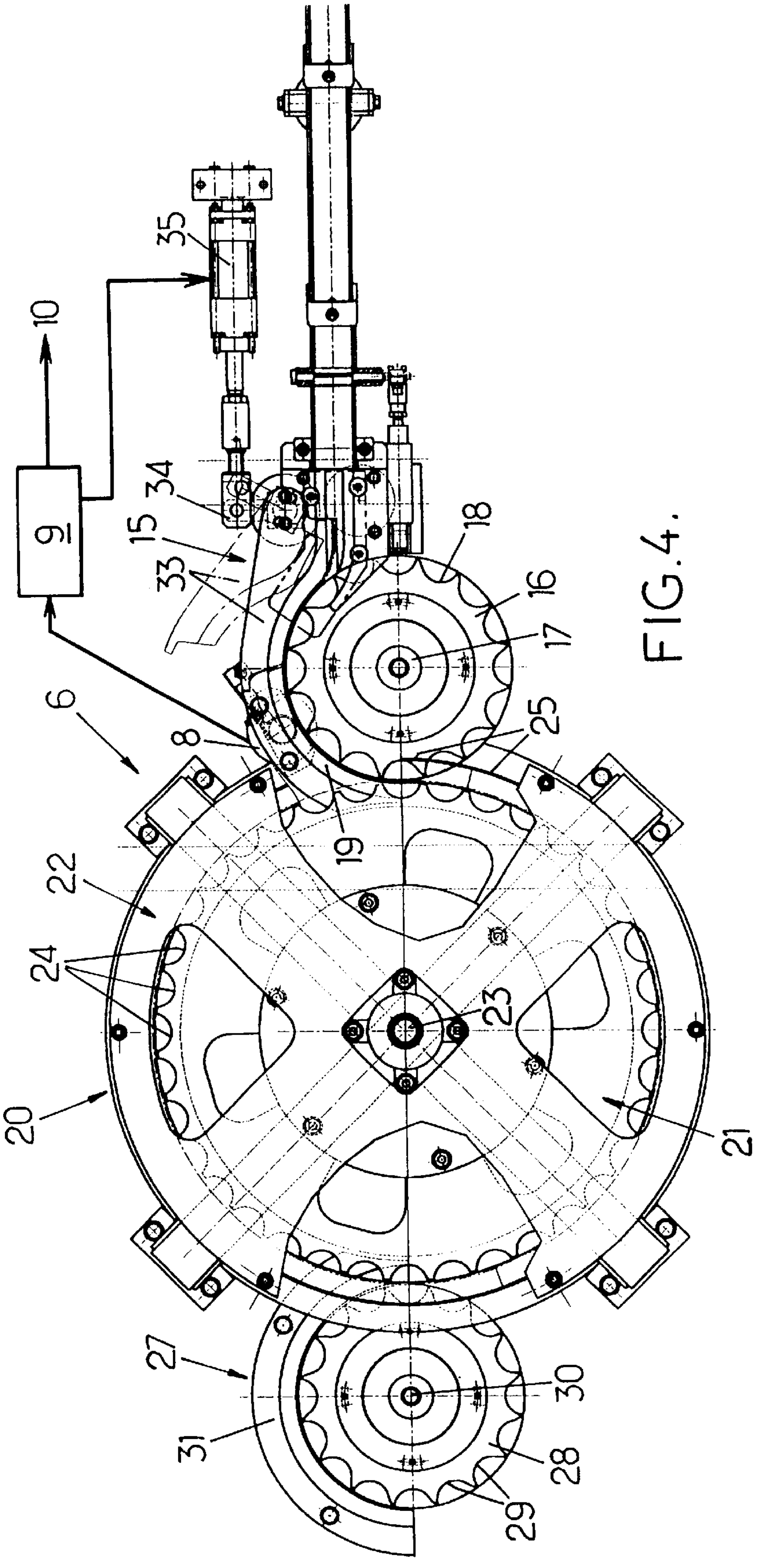

The device for the storage of stoppers which has just been described may also be arranged to ensure the management of the supply of stoppers in the event of an incident in the supply of containers: to this end, it is acknowledged that the aforementioned device 10, located upstream of the pre-specified part 7 of the installation, is arranged to detect the supplied containers and to transmit the information to the management unit 9 in order that this controls in an appropriate way the device 8 arranged in addition, on its part, to manage the supply of stoppers to the inlet of the storage device 6: either the unit 9 controls the device 8 to stop the arrival of stoppers in the storage device 6 by the use of means for which an example will be given later within the framework of the preferred version illustrated in FIG. 4, or the unit 9 controls a slowing down of the supply of stoppers so as to cause a sliding or moving back of the stoppers relative to the containers (in particular when the moving back involves a small number) or any other equivalent action not bringing about the actual stopping of the supply of stoppers.

The device for the dynamic storage of stoppers can be of any type suitable to satisfy the requirements mentioned above.

However, it is understood that the number of stoppers which it is led to dynamically contain can be very high: in the aforementioned latter case, the number of stoppers to be held in reserve in correspondence with the number of containers present in the part 7*c* of the installation can be very significant and reach for example several hundreds. In these conditions, a device for the dynamic storage of stoppers having a single horizontal extension would be very large and therefore expensive in the ground surface occupied.

Figure 3:
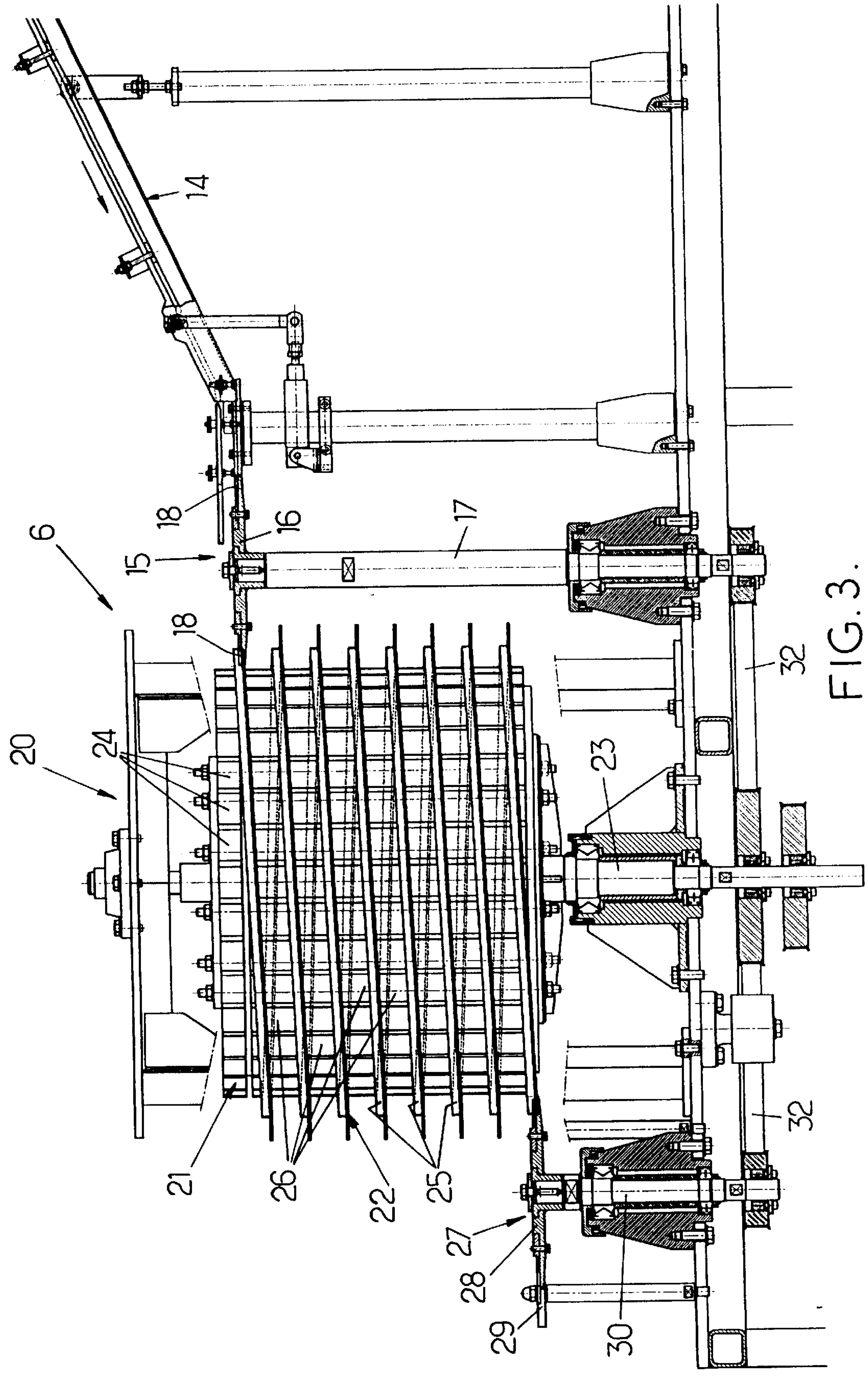
FIGS. 3 and 4 are respectively side and plan views of a device for the dynamic storage of stoppers arranged according to the invention.

It is therefore essential, so as not to thoughtlessly increase the horizontal development of the installation, to design a storage device with a vertical extension and relatively small vertical surface projection. The invention proposes such a device which is shown in FIGS. 3 and 4.

The dynamic storage device 6 includes means for the supply of stoppers made up of in particular a chute 14 for introducing stoppers in-line one following the other coming from a bulk supply and from a disentangling, positioning unit (open upwards or preferably open downwards) and putting in line (not shown).

At the bottom of the chute, gripping means 15 grab the stoppers one by one, keeping them separated from each other by a pre-specified pitch, in order to bring them to the following device. In the example shown, the gripping means 15 include a rotating wheel 16 with a vertical axis 17 which is provided peripherally with a multiplicity of notches 18. A circular arc guide 19, located opposite the wheel 16, keeps the stoppers in the respective notches 18, the circular arc guide having an extent of about a half turn.

The gripping means 15 supply the dynamic storage device itself or the stopper buffer reserve designated in its entirety by the reference 20; this device comprises a central vertical cylinder 21 and a peripheral helicoidal track 22.

The central cylinder is placed vertically and provided with a vertical rotation shaft 23. Its peripheral surface is provided with a multiplicity of vertical parallel cavities 24, in the shape of successive grooves, extending over all its height.

The fixed helicoidal track 22 tightly surrounds the cylinder 21 being coiled up over the whole of its height and its external edge is provided with a rim 25 retaining and guiding the stoppers.

The union of the vertical cavities 24 with the cylinder 21 and with the helicoidal track 22 defines a multiplicity of momentary housings 26 with double rotating and vertical sliding mobility, which are each suitable to shelter a stopper and to drive the stoppers from one end to the other of the helicoidal track 22. The number of these housings 26 is a function of the diameter of the cylinder 21, of the number of vertical cavities in its external surface, of the coiling pitch of the helicoidal track 22 and of the height of the device. It will be noted that, for a given vertical projection size and everything else being equal, the capacity of the device can be adjusted by varying its height and/or the pitch of the helicoidal track.

In the case shown, the movement of the stoppers on the inclined helicoidal track 22 under the driving action of the rotating cylinder 21 is carried out in the descending direction. Because of this the inlet of the stoppers is made in the top part of the device as illustrated in FIGS. 3 and 4.

Finally it will be observed, as is visible in FIG. 4, that the end of the aforementioned guide 19 extends, beyond the contour of the wheel 16, as far as the inside of the helicoidal track 22 opposite the start of its rim 25, so that in this place the stoppers are forced to be engaged between the guide 19 and the rim 25 in order to leave the wheel 16 and to be engaged on the track 22.

Preferably the pitch spacing of the notches 18 of the wheel 16 and the pitch spacing of the vertical cavities 24 of the cylinder 21 are equal, and the wheel 16 and the cylinder 21 rotate synchronously so that all the notches 18 of the wheel 16 loaded with respective stoppers are unloaded successively into all the housings 26 defined by the cavities 24 of the cylinder 21.

Once having reached the base of the helicoidal track 22, the stoppers are grabbed by gripping means 27, which can be similar to the means 15 placed at the top of the device, and made up of a wheel 28 with notches 29 rotating around a vertical axis 30, this wheel being accompanied by a circular arc guide 31.

The axes 17, 23 and 30 are driven synchronously, not only together, but also with the other parts of the installation. Because of this, there is no need to provide a specific motorisation for the dynamic storage device 6 and the driving is obtained by a system of belts, chains or similar, designated as 32 in FIG. 3, or alternatively several servomotor means are used between them in particular when it is desired to cause a sliding between the supplies of stoppers and containers as mentioned above in the event of a container supply incident.

The arrangement of the device 20 gives the advantage of individualising the locations occupied by the successive stoppers, and therefore to ensure that, all the housings 25 being occupied, the device actually contains the number of stoppers necessary for the supply of all the containers present at a given instant in the specified part 7 of the installation. In addition it is possible, if necessary, to carry out a visual control in order to ensure that all the housings 26 are actually occupied.

By means of this device and the control which is associated with it, it is possible to anticipate the effects of an anomaly in the supply of stoppers, and to see to it that a stopping of the installation necessary for the processing of this anomaly does not cause moreover other unfavourable effects increasing the cost of the incident.

Furthermore, in the event of a container supply incident, the management unit 9 is capable of causing the stopping of the supply of stoppers onto the wheel 16: to this effect, either a door (such as a locking peg) is provided at the upstream end of the guide 19, or, as shown in FIG. 4, a guide section 33 able to radially move away from the periphery of the wheel under the action of a driving part 34 controlled by a motor 35 placed under the part of the management unit 9, by means of which arrangement the stoppers are ejected through the guide section 33 in the open position.

As it goes without saying and as results already from before, the invention is not in the least restricted to those applications and versions which have been most particularly considered; it encompasses on the contrary all the variants.

What is claimed is:

1. A device for the dynamic storage of a pre-specified number of stoppers intended for the closing as they pass of filled container this device comprising:

means (15) for the supply of stoppers pre-positioned and placed one after the other with a pre-specified pitch, conveyor means (20 22, 24, 26) moving the stoppers on a trajectory having a length a function of aforesaid pre-specified number of stoppers, and removal means (27) located at the outlet of said conveyor means for grabbing the stoppers one by one, characterised in that the conveyor means include:

a cylinder (21) rotating around a vertical axis (23) and having, on its peripheral surface, a multiplicity of vertical parallel cavities (24), and a fixed helicoidal track (22) tightly surrounding the cylinder (21) over all its height and suitable to support stoppers otherwise partially engaged individually in aforesaid respective cavities of the cylinder so as to be driven on the helicoidal trajectory defined by the track when the cylinder rotates the number of turns of the helicoidal track and the number of vertical cavities formed on the periphery of the cylinder defining the aforesaid pre-specified number of stoppers present simultaneously in the device.

2. A device according to claim 1, characterised in that the supply means (15) comprise a rotating wheel (16) which has peripheral notches (18) spaced with the same pitch as the vertical cavities (24) of the cylinder (21) and which is suitable to grab the stoppers presented in line and to deliver them onto the end of the helicoidal track (22) respectively into the successive vertical cavities (24) of the cylinder.

* * * * *